United States Patent
Chen et al.

(10) Patent No.: US 7,724,619 B2
(45) Date of Patent: May 25, 2010

(54) POWER ADJUSTING METHOD FOR PICKUP HEAD ACCESSING OPTICAL DISC AND OPTICAL DISC INFORMATION REPRODUCTION DEVICE THEREOF

(75) Inventors: Shu-Ching Chen, Tao-Yuan Hsien (TW); Chi-Pei Huang, Miaoli County (TW)

(73) Assignee: MediaTek Inc., Hsin-Chu (TW)

( * ) Notice: Subject to any disclaimer, the term of this patent is extended or adjusted under 35 U.S.C. 154(b) by 717 days.

(21) Appl. No.: 11/559,409

(22) Filed: Nov. 14, 2006

(65) Prior Publication Data

US 2007/0127334 A1 Jun. 7, 2007

Related U.S. Application Data

(60) Provisional application No. 60/597,496, filed on Dec. 6, 2005.

(51) Int. Cl.
G11B 7/00 (2006.01)
(52) U.S. Cl. .................. 369/47.5; 369/116
(58) Field of Classification Search ............. 369/53.5, 369/53.51, 53.52, 53.53, 116, 120, 121, 47.5, 369/47.51, 47.52, 122, 124.06, 124.14, 44.28
See application file for complete search history.

(56) References Cited

U.S. PATENT DOCUMENTS 4,813,034 A 3/1989 Mashimo
4,937,809 A 6/1990 Miyadera et al.
5,586,099 A 12/1996 Finkelstein et al.
6,545,964 B1 4/2003 Takase et al.
6,901,039 B1 * 5/2005 Sugie et al. ............. 369/47.28
6,904,009 B2 * 6/2005 Mashimo et al. .......... 369/47.5
6,975,572 B2 * 12/2005 Matsumoto ............. 369/47.53
7,053,919 B2 * 5/2006 Nagano .................... 347/236
2002/0105874 A1 8/2002 Matsumoto
2003/0107642 A1 6/2003 Nagano

FOREIGN PATENT DOCUMENTS

| CN | 1598937 A | 3/2005 |
|---|---|---|
| JP | 2001344754 | 12/2001 |
| JP | 2003-217126 | 7/2003 |
| JP | 2003281724 | 10/2003 |
| TW | 1226620 | 1/2005 |
| TW | 1233106 | 5/2005 |

* cited by examiner

Primary Examiner—Nabil Z Hindi
(74) Attorney, Agent, or Firm—Winston Hsu

(57) ABSTRACT

A power adjusting method for a pickup head accessing an optical disc. The method includes identifying a target data transfer rate utilized by the PUH for accessing the optical disc; calculating an appropriate laser power according to the target data transfer rate; and accessing the optical disc by the PUH at the target data transfer rate with the appropriate laser power.

18 Claims, 7 Drawing Sheets

POWER ADJUSTING METHOD FOR PICKUP HEAD ACCESSING OPTICAL DISC AND OPTICAL DISC INFORMATION REPRODUCTION DEVICE THEREOF

CROSS REFERENCE TO RELATED APPLICATIONS

This non-provisional application claims the benefit of U.S. Provisional Application No. 60/597,496, which was filed on Dec. 06, 2005 and is included herein by reference.

BACKGROUND

The present invention relates to controlling a pickup head, and more particularly, to a power adjusting method for a pickup head accessing an optical disc and an optical disc information reproduction device utilizing the same.

In an optical disc information reproduction device, such as a digital versatile disc (DVD) recorder, lasers have been commonly used for reading and/or recording digital data onto an optical disc. When the optical disc information reproduction device accesses the optical disc with an insufficient laser power, quality of reflected signal from the optical disc is poor. On the other hand, when the optical disc information reproduction device accesses the optical with an excessive laser power, the optical disc may be damaged and the digital data on the optical disc may be erased.

Moreover, data transfer rates may vary as a pickup head moves from one location to another location on the optical disc. Different data transfer rates correspond to different relative linear velocities between the pickup head and the optical disc, so a laser power for the pickup head to access the optical disc at one data transfer rate may be too low or too high for the pickup head to access the optical disc at another data transfer rate.

Therefore, an improved method to appropriately adjust a laser power for a pickup head to access an optical disc would be greatly beneficial.

SUMMARY

The present invention discloses a power adjusting method for a pickup head (PUH) accessing an optical disc, comprising identifying a target data transfer rate utilized by the PUH for accessing the optical disc; calculating an appropriate laser power according to the target data transfer rate; and accessing the optical disc by the PUH at the target data transfer rate with the appropriate laser power.

The present invention also discloses an optical disc information reproduction device, comprising a pickup head (PUH), for accessing an optical disc; a decision unit, electrically coupled to the PUH, for identifying a target data transfer rate utilized by the PUH for accessing the optical disc; a calculation unit, electrically coupled to the decision unit, for calculating an appropriate laser power according to the target data transfer rate; and a control unit, electrically coupled to the PUH, the decision unit, and the calculation unit, for controlling the PUH to access the optical disc at the target data transfer rate with the appropriate laser power.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
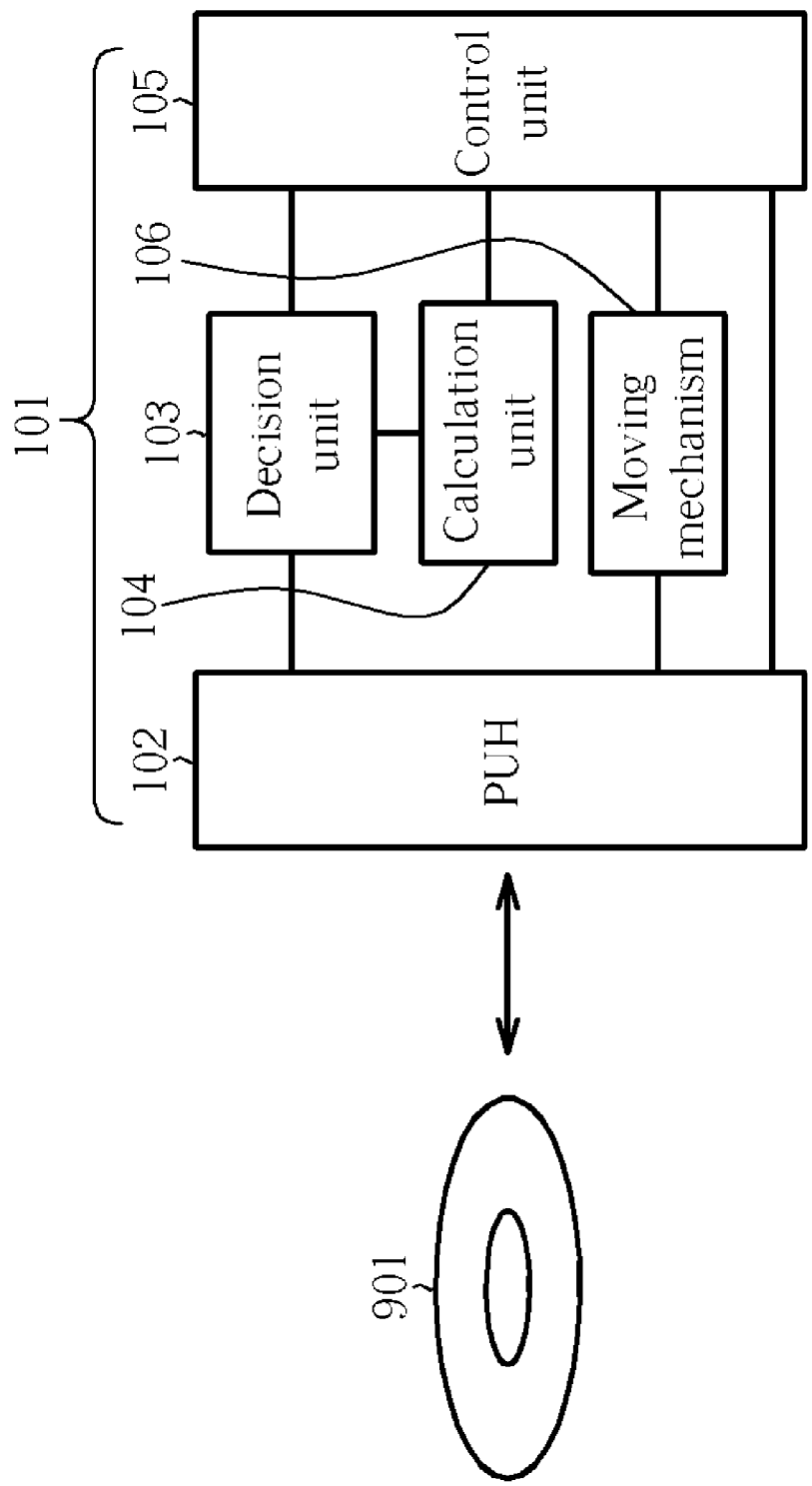
FIG. 1 is a block diagram illustrating an optical disc information reproduction device according to an embodiment of the present invention.

FIG. 1 is a block diagram illustrating an optical disc information reproduction device 101 according to an embodiment of the present invention. The optical disc information reproduction device 101 comprises a pickup head (PUH) 102, a decision unit 103, a calculation unit 104, a control unit 105, and a moving mechanism 106. As shown in FIG. 1, the decision unit 103 is electrically coupled to the PUH 102; the calculation unit 104 is electrically coupled to the decision unit 103; the control unit 105 is electrically coupled to the PUH 102, the decision unit 103, and the calculation unit 104; and the moving mechanism 106 is connected to the PUH 102 and the control unit 105. Additionally, the optical disc information reproduction device 101 utilizes the PUH 102 to access an optical disc 901 under a preset motor control mode. Typically, the preset motor control mode can be a constant angular velocity (CAV) mode, a zoned constant angular velocity (ZCAV) mode, or a partial constant angular velocity (PCAV) mode according to the design of the optical disc information reproduction device 101. The moving mechanism 106 is a well-known component used for moving the PUH 102 on the optical disc 901. Please note that the optical disc information reproduction device 101 has more components, but only the components related to the present invention are shown in FIG. 1.

Figure 2:
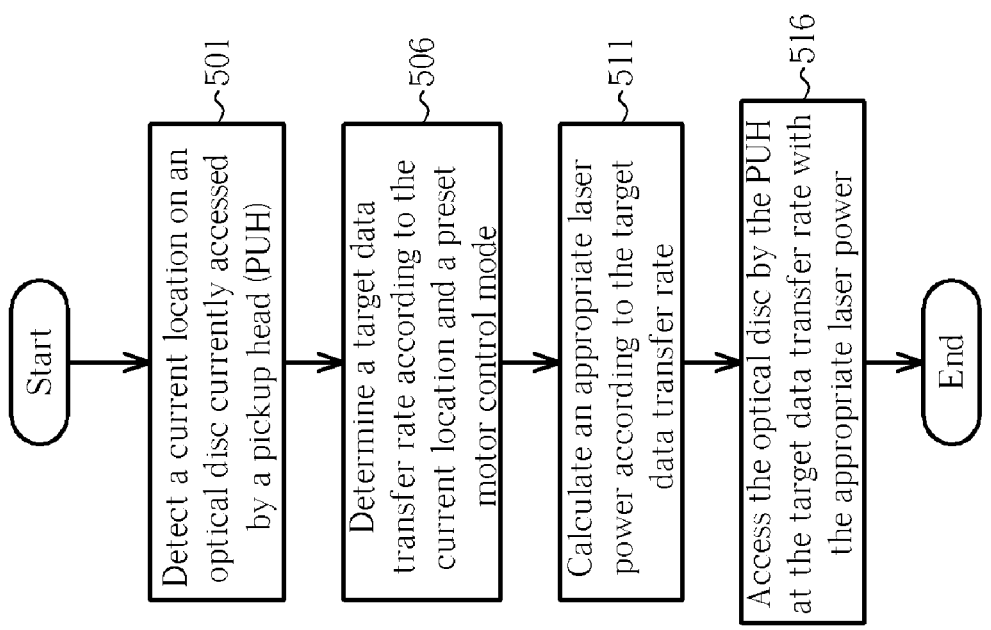
FIG. 2 is a flowchart of a power adjusting method for a pickup head (PUH) accessing an optical disc under a tracking command.

FIG. 2 is a flowchart of a power adjusting method for the PUH 102 accessing the optical disc 901 under a tracking command. As shown in FIG. 2, the method comprises the following steps:

STEP 501: Detect a current location on an optical disc currently accessed by a pickup head (PUH);

STEP 506: Determine a target data transfer rate according to the current location and a preset motor control mode;

STEP 511: Calculate an appropriate laser power according to the target data transfer rate; and STEP 516: Access the optical disc by the PUH at the target data transfer rate with the appropriate laser power.

The operation of adjusting laser power of the PUH 102 using the power adjusting method of the present invention is described in detail as follows.

Figure 3:
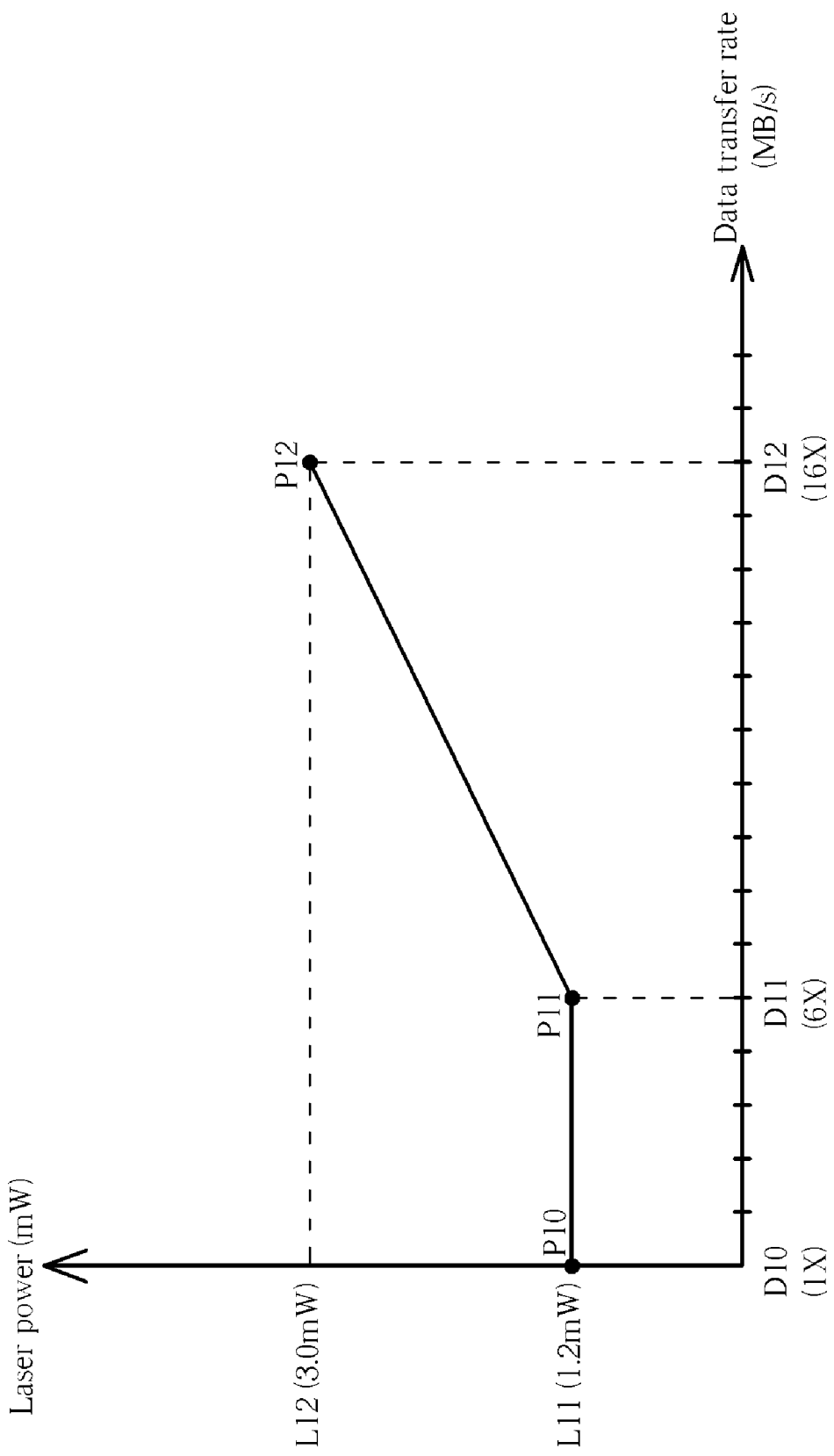
FIG. 3 is a diagram illustrating a characteristic curve between a laser power and a data transfer rate appropriate for a PUH to access an optical disc.

FIG. 3 is a diagram illustrating a characteristic curve between a laser power and a data transfer rate appropriate for the PUH 102 to access the optical disc 901. The characteristic curve starts from a start point P10, moves horizontally to a turning point P11, and then moves diagonally upwards to an end point P12. As shown in FIG. 3, a first laser power L11 corresponds to a first data transfer rate D11 at the turning point P11, and a second laser power L12 corresponds to a second data transfer rate D12 at the end point P12. Additionally, the second laser power L12 is greater than the first laser power L11, and the second data transfer rate D12 is greater than the first data transfer rate D11. In this embodiment, data transfer rates D10, D11, D12 correspond to 1×, 6×, and 16× respectively, where a data transfer rate of 4.3218 MB/s is typically defined as 1×. The first data transfer rate D11 is 6×, which represents 4.3218 MB/s times six, i.e. 25.9308 MB/s, and the corresponding first laser power L11 is 1.2 mW. The second data transfer rate D12 is 16×, i.e. 69.1488 MB/s, and the corresponding second laser power L12 is 3.0 mW. This is not meant to be a limitation of the present invention, however.

To build the characteristic curve in FIG. 3, the first laser power L11 is first determined by experimental experience, ensuring that a radio frequency (RF) signal, a tracking error (TE) signal, a focusing error (FE) signal, and other required signals generated according to the first laser power L11 are adequate while the PUH 102 utilizes the first laser power L11 to access the whole optical disc 901. Then, the first data transfer rate D11 is determined as the maximum data transfer rate at which the PUH 102 can still correctly access the optical disc 901 with the predetermined first laser power L11. Additionally, the second data transfer rate D12 is the maximum data transfer rate predetermined by the specification of the optical disc information reproduction device 101. Finally, the second laser power L12 is determined as the maximum laser power with which the PUH 102 can still correctly access the optical disc 901 at the second data transfer rate D12.

The detailed description as to how the optical disc information reproduction device 101 applies the above-mentioned method for adjusting a laser power for the PUH 102 under a tracking command is as follows. Additionally, according to the preset motor control mode under which the PUH 102 accesses the optical disc 901, there are three situations: CAV mode, ZCAV mode, and PCAV mode.

Figure 4:
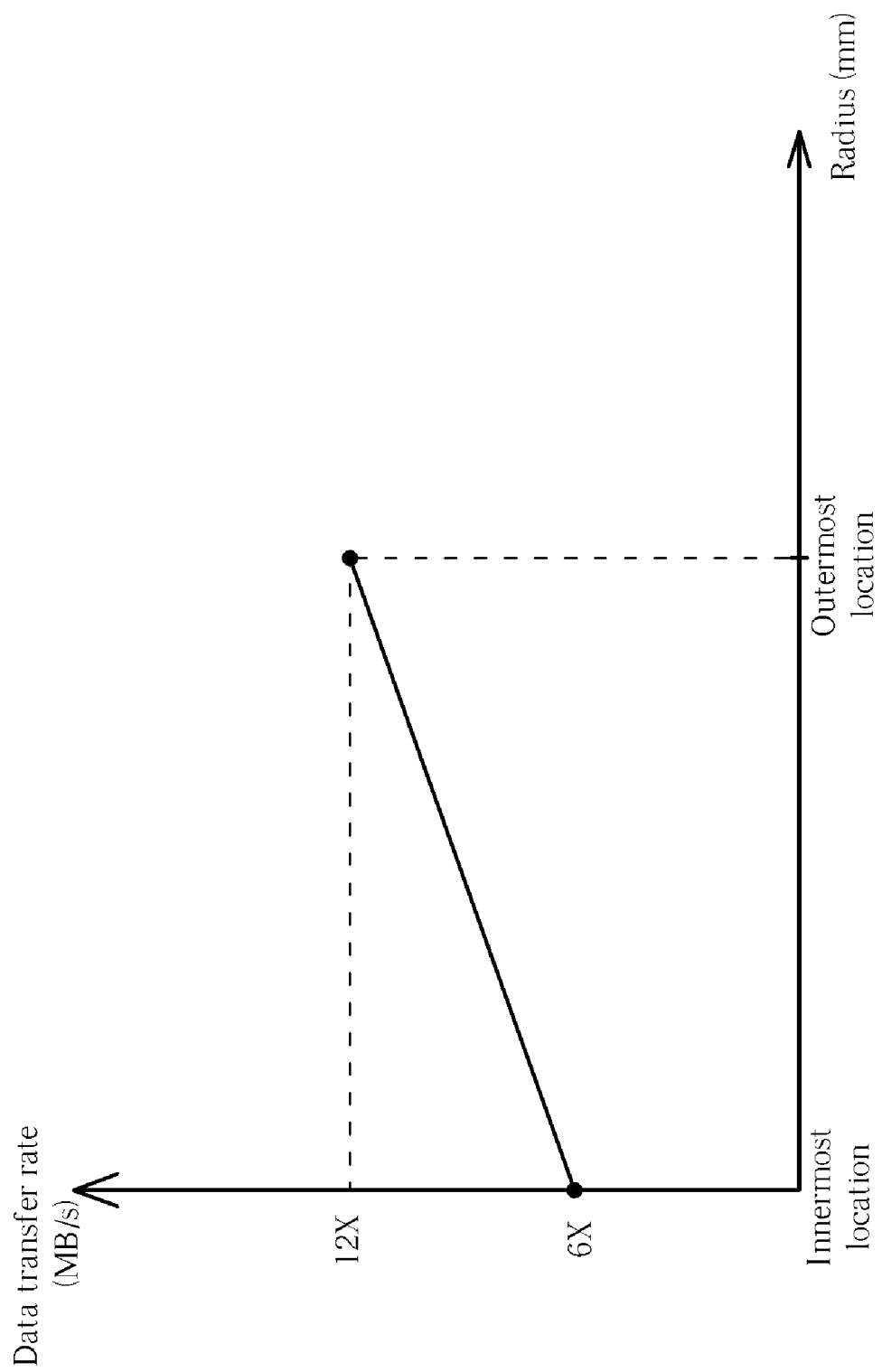
FIG. 4 is a diagram illustrating a characteristic curve between a data transfer rate and a radius under a CAV mode.

Please refer to FIGS. 1-3 in conjunction with FIG. 4, wherein FIG. 4 is a diagram illustrating a characteristic curve between a data transfer rate and a radius under a CAV mode. Assume that the data transfer rate, which is in proportion to the linear velocity of the optical disc 901, falls in a range from 6× through 12× when the optical disc 901 is rotated at a constant angular velocity. As shown in FIG. 4, under the CAV mode, the PUH 102 accesses the innermost location, i.e. 0, of the optical disc 901 at a data transfer rate of 6×, and the outermost location, i.e. 0×221000, of the optical disc 901 at another data transfer rate of 12×. To adjust a laser power for the PUH 102 under a tracking command, the decision unit 103 first detects a current location on the optical disc 901 currently accessed by the PUH 102 (STEP 501). In this embodiment, the detected current location is 0×80000. Then the decision unit 103 determines a target data transfer rate according to the current location, i.e. 0×80000, and the preset motor control mode, i.e. the CAV mode (STEP 506). Specifically speaking, the target data transfer rate is calculated as 7.4×, i.e. 31.9813 MB/s, utilizing the following formula.

$$\frac{(12-6)}{(0\times 221000 - 0)} *(0\times 80000 - 0) + 6 \cong 7.4$$

Further, the calculation unit 104 calculates an appropriate laser power according to the target data transfer rate, i.e. 7.4×, by referencing the characteristic curve shown in FIG. 3 (STEP 511). Specifically speaking, the target data transfer rate, i.e. 7.4×, is between the first data transfer rate D11, i.e. 6×, and the second data transfer rate D12, i.e. 16×, so the calculation unit 104, in this embodiment, performs a linear interpolation to determine the appropriate laser power between the first laser power L11, i.e. 1.2 mW, and the second laser power L12, i.e. 3.0 mW, to be 1.45 mW, utilizing the following formula.

$$\frac{(3.0-1.2)}{(16-6)} *(7.4-6) + 1.2 \cong 1.45$$

Please note that, although the calculation unit 104 performs a linear interpolation to determine the appropriate laser power between the first laser power L11 and the second laser power L12, this is not meant to be a limitation of the present invention. For example, in another embodiment, the calculation unit 104 can determine the appropriate laser power using a table relating to the first laser power L11 and the second laser power L12. Furthermore, in still another embodiment, the characteristic curve from the turning point P11 to the end point P12 in FIG. 3 can be zigzag or in any other possible style, and the calculation unit 104 thus determine the appropriate laser power by referencing the characteristic curve accordingly.

Finally, the control unit 105 controls the PUH 102 to access the optical disc 901 at the target data transfer rate, i.e. 7.4×, with the appropriate laser power, i.e. 1.45 mW (STEP 516). The process ends at this point. Additionally, in this embodiment, the appropriate laser power is utilized by the PUH 102 as a read power to read out information pre-recorded at the current location on the optical disc 901. The disclosed method is not limited to determining read power, however. Other alternative designs utilizing the same concept are possible and fall in the scope of the present invention.

Figure 5:
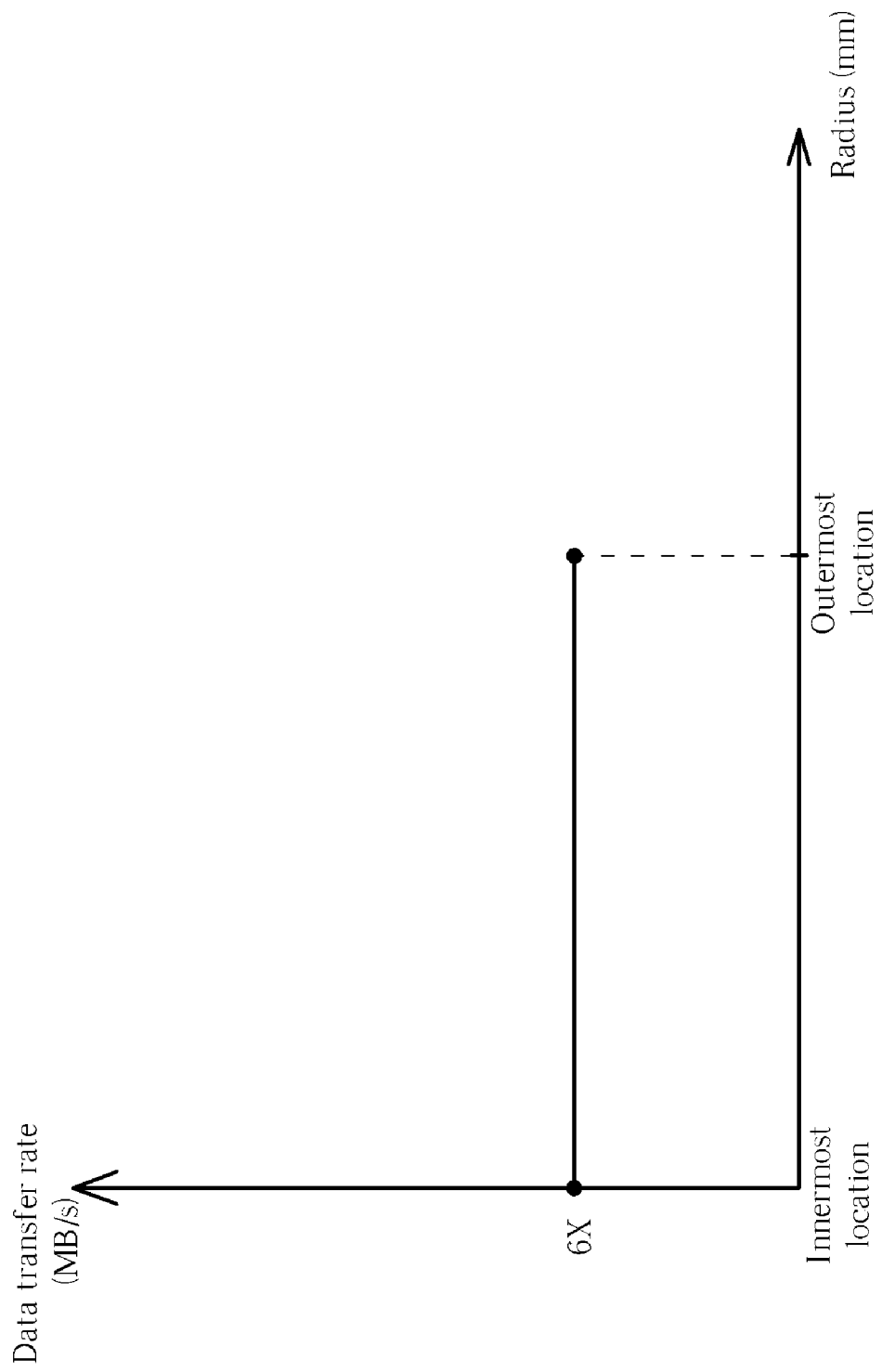
FIG. 5 is a diagram illustrating a characteristic curve between a data transfer rate and a radius under a ZCAV mode.

Please refer to FIGS. 1-3 in conjunction with FIG. 5, wherein FIG. 5 is a diagram illustrating a characteristic curve between a data transfer rate and a radius under a ZCAV mode. As shown in FIG. 5, under the ZCAV mode, the PUH 102 can access the optical disc 901 anywhere at a fixed data transfer rate, for example 6×. Therefore, for this case, STEP 501 can be skipped, and STEP 506 is reduced to "identifying a target data transfer rate utilized by a pickup head for accessing an optical disc". To adjust a laser power for the PUH 102 under a tracking command, the decision unit 103 first identifies a target data transfer rate utilized by the PUH 102 for accessing the optical disc 901 to be 6× in this embodiment (STEP 506). Then, the calculation unit 104 calculates an appropriate laser power according to the target data transfer rate, i.e. 6×, by referencing the characteristic curve in FIG. 3 (STEP 511).

Accordingly, the target data transfer rate 6× corresponds to a laser power of 1.2 mW, so the calculation unit 104 determines the appropriate laser power to be 1.2 mW.

Finally, the control unit 105 controls the PUH 102 to access the optical disc 901 at the target data transfer rate, i.e. 6×, with the appropriate laser power, i.e. 1.2 mW (STEP 516). The process ends at this point. Additionally, in this embodiment, the appropriate laser power is utilized by the PUH 102 as a read power to read out information pre-recorded on the optical disc 901. This is not meant to be a limitation of the present invention, however.

Figure 6:
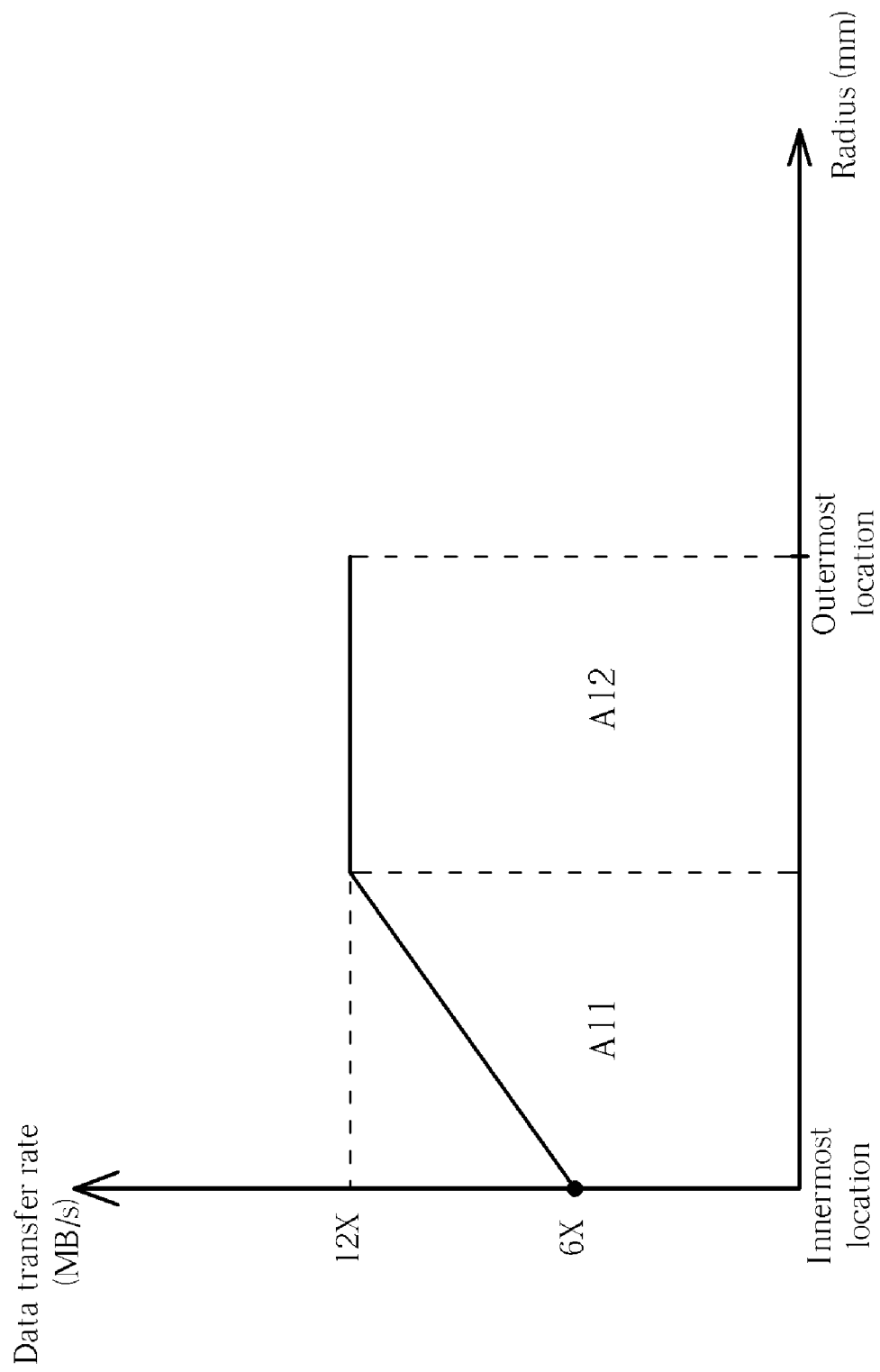
FIG. 6 is a diagram illustrating a characteristic curve between a data transfer rate and a radius under a PCAV mode.

FIG. 6 is a diagram illustrating a characteristic curve between a data transfer rate and a radius under a PCAV mode. As shown in FIG. 6, the PCAV mode is basically a mixed mode of the CAV mode and the ZCAV mode, and therefore the optical disc 901 contains a CAV area A11 and a ZCAV area A12 correspondingly, wherein the data transfer rate in the CAV area A11 falls in a range from 6× through 12×, and the data transfer rate in the ZCAV area A12 is fixed at 12×. To adjust a laser power for the PUH 102 under a tracking command, the decision unit 103 first detects a current location on the optical disc 901 currently accessed by the PUH 102 (STEP 501). If the detected current location is at the CAV area A11, the same process as described above for the CAV mode is executed and thus omitted herein for simplicity. Similarly, if the detected current location is at the ZCAV area A12, the same process as described above for the ZCAV mode is executed and thus omitted herein for simplicity.

Figure 7:
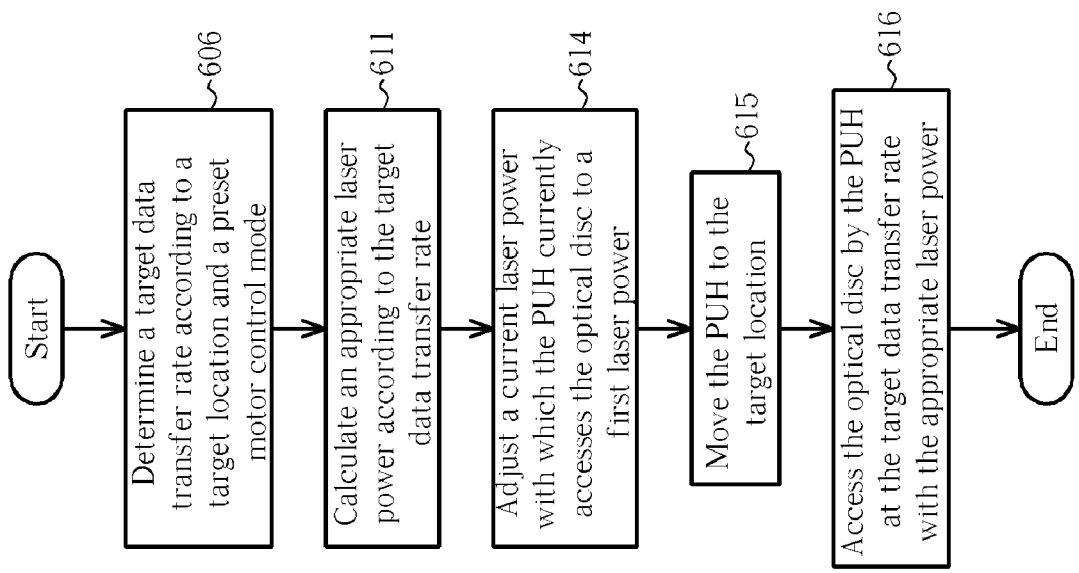
FIG. 7 is a flowchart of a power adjusting method for a PUH accessing an optical disc under a seek command.

FIG. 7 is a flowchart of a power adjusting method for the PUH 102 accessing the optical disc 901 under a seek command. As shown in FIG. 7, the method comprises the following steps:

STEP 606: Determine a target data transfer rate according to a target location and a preset motor control mode;

STEP 611: Calculate an appropriate laser power according to the target data transfer rate;

STEP 614: Adjust a current laser power with which the PUH currently accesses the optical disc to a first laser power;

STEP 615: Move the PUH to the target location; and

STEP 616: Access the optical disc by the PUH at the target data transfer rate with the appropriate laser power.

The detailed description as to how the optical disc information reproduction device 101 applies the above-mentioned method for adjusting a laser power for the PUH 102 under a seek command is as follows. Additionally, according to the preset motor control mode under which the PUH 102 accesses the optical disc 901, there are three situations: CAV mode, ZCAV mode, and PCAV mode.

Please refer to FIGS. 1, 3, 4, and 7. Under the CAV mode, the PUH 102 accesses the innermost location, i.e. 0, of the optical disc 901 at a data transfer rate of 6×, and the outermost location, i.e. 0×221000, of the optical disc 102 at another data transfer rate of 12×. To adjust a laser power for the PUH 102 under a seek command (i.e. when the control unit 105 receives a seek command indicating that the PUH 102 is requested to be moved to a target location), the decision unit 103 determines a target data transfer rate according to the target location and the preset motor control mode (STEP 606). In this embodiment, the target location indicated by the seek command is 0×180000, and the preset motor control mode is the CAV mode. Thus, the target data transfer rate is calculated as 10.2×, i.e. 44.0824 MB/s, by the following formula.

$$\frac{(12-6)}{(0\times 221000 - 0)} * (0\times 180000 - 0) + 6 \cong 10.2$$

Then, the calculation unit 104 calculates an appropriate laser power according to the target data transfer rate, i.e. 10.2×, by referencing the characteristic curve in FIG. 3 (STEP 611). Specifically speaking, the target data transfer rate, i.e. 10.2×, is between the first data transfer rate D11, i.e. 6×, and the second data transfer rate D12, i.e. 16×, so the calculation unit 104 performs a linear interpolation to determine the appropriate laser power between the first laser power L11, i.e. 1.2 mW, and the second laser power L12, i.e. 3.0 mW, to be 1.96 mW, utilizing the following formula.

$$\frac{(3.0-1.2)}{(16-6)} * (10.2 - 6) + 1.2 \cong 1.96$$

The calculated appropriate laser power, i.e. 1.96 mW, is stored at this point for future reference. Then, the control unit 105 adjusts a current laser power with which the PUH 102 currently accesses the optical disc 902 to the first laser power L11, i.e. 1.2 mW (STEP 614), and then controls the moving mechanism 106 to move the PUH 102 to the target location, i.e. 0×180000 (STEP 615). Please note that, in another embodiment, the control unit 105 can adjust the current laser power with which the PUH 102 currently accesses the optical disc 902 to the appropriate laser power, i.e. 1.96 mW in STEP 614. Furthermore, in still another embodiment, the control unit 105 can adjust the current laser power with which the PUH 102 currently accesses the optical disc 902 to be any other value derived from a formula relating to the first laser power L11, i.e. 1.2 mW, and the appropriate laser power, i.e. 1.96 mW, in STEP 614.

Finally, after the PUH 102 is moved to the target location, the control unit 105 controls the PUH 102 to access the optical disc 901 at the target data transfer rate, i.e. 10.2×, with the appropriate laser power, i.e. 1.96 mW (STEP 616). The process ends at this point. Additionally, in this embodiment, the appropriate laser power is utilized by the PUH 102 as a read power to read out information prerecorded at the target location on the optical disc 901. This is not meant to be a limitation to the present invention, however.

Please note that, in other embodiments, if the target data transfer rate falls in a range from D10 through D11, a fixed laser power (i.e. the first laser power L11) is adopted directly. In other words, in a case where the target data transfer rate varies within the above-mentioned range between D10 and D11 under tracking or seek control (i.e. if the target data transfer rate is not greater than D11), no laser power switching/adjusting is required.

After reading the above description as to the seek control under the CAV mode, those skilled in this art can easily understand the seek operation under the ZCAV mode and thus further description is omitted herein for simplicity. Additionally, as to the seek control under the PCAV mode, when the control unit 105 receives a seek command indicating that the PUH 102 is requested to be moved to a target location, the control unit 105 will first check which area the target location lies. Please refer to FIG. 6, if the target location is in the CAV area A11, the same process as described above for the CAV mode is executed and thus omitted herein for simplicity.

Similarly, if the target location is in the ZCAV area A12, the same process for the ZCAV mode is executed and thus omitted herein for simplicity.

Please note that although the decision unit 103, the calculation unit 104, and the control unit 105 are shown in FIG. 1 as individual hardware components, this is not meant to be a limitation of the present invention. For example, the functionality of the decision unit 103, the calculation unit 104, or the control unit 105 can be implemented by using programmable code. The aforementioned power adjusting methods can thus be implemented by software, i.e. firmware stored in any storage accessible to the control unit 105. The storage can be a static random access memory (SRAM) or any other kind of memory if appropriate. Additionally, the control unit 105 can be a microprocessor used for executing the firmware to perform the above-mentioned processes.

Please note that the optical disc information reproduction device 101 can be a read-only optical disc drive, an optical disc recording device, an optical disc combo drive, or any other kind of optical disc drive. In addition, although the above embodiments disclose the CAV mode, the ZCAV mode, and the PCAV mode under which the PUH 102 accesses the optical disc 901, it is not limited to operate under those motor control modes. That is, the two methods disclosed in the above preferred embodiment of the present invention are also effective and feasible solutions for another optical disc information reproduction device utilizing a PUH to access an optical disc under other motor control modes that require dynamic laser power adjustment.

In the present invention, a laser power is appropriately adjusted based on a target data transfer rate for a pickup head to access an optical disc under a tracking command, thereby ensuring correct access of information on the optical disc even when a considerably high data transfer rate is utilized.

Moreover, in the present invention, a current laser power with which a pickup head currently accesses an optical disc is adjusted to a fixed low laser power before the pickup head is moved to a target location, thereby saving laser power. Additionally, RF signals, TE signals, FE signals, or other required signals generated based on the fixed low laser power during the period when the pickup head is moving from one location to another location, i.e. seek operation, can be more reliable and exempted from further modification or calibration due to unfixed laser powers utilized in the related art. Moreover, a laser power is appropriately adjusted based on a target data transfer rate for the pickup head to access information at the target location on the optical disc after the pickup head is moved to the target location, thereby ensuring correct access of the information at the target location on the optical disc even when a considerably high data transfer rate is utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power adjusting method for a pickup head (PUH) accessing an optical disc, comprising:
   identifying a target data transfer rate utilized by the PUH for accessing the optical disc;
   calculating an appropriate laser power according to the target data transfer rate; and
   accessing the optical disc by the PUH at the target data transfer rate with the appropriate laser power;
   wherein the step of calculating the appropriate laser power according to the target data transfer rate comprises:
   setting the appropriate laser power as a first laser power directly if the target data transfer rate is not greater than a first data transfer rate; and
   determining the appropriate laser power between the first laser power and a second laser power if the target data transfer rate is between the first data transfer rate and a second data transfer rate, wherein the first laser power corresponds to the first data transfer rate, and the second laser power corresponds to the second data transfer rate.

2. The method of claim 1, wherein a linear interpolation is performed to determine the appropriate laser power between the first laser power and the second laser power if the target data transfer rate is between the first data transfer rate and the second data transfer rate.

3. The method of claim 1, wherein the first laser power corresponding to any identified target data transfer rate not greater than the first data transfer rate is fixed.

4. The method of claim 1, wherein the first data transfer rate is the maximum data transfer rate at which the PUH can correctly access the optical disc with the first laser power, and the second laser power is the maximum laser power with which the PUH can correctly access the optical disc at the second data transfer rate.

5. The method of claim 1, wherein the PUH accesses the optical disc under a preset motor control mode, and the step of identifying the target data transfer rate utilized by the PUH for accessing the optical disc comprises:
   detecting a current location on the optical disc currently accessed by the PUH; and
   determining the target data transfer rate according to the current location and the preset motor control mode.

6. A power adjusting method for a pickup head (PUH) accessing an optical disc, comprising:
   identifying a target data transfer rate utilized by the PUH for accessing the optical disc;
   calculating an appropriate laser power according to the target data transfer rate; and
   accessing the optical disc by the PUH at the target data transfer rate with the appropriate laser power;
   wherein the step of identifying the target data transfer rate utilized by the PUH for accessing the optical disc is performed upon receipt of a seek command indicating the PUH is requested to be moved to a target location, the step of calculating the appropriate laser power according to the target data transfer rate comprises setting the appropriate laser power as a first laser power directly if the target data transfer rate is not greater than a first data transfer rate, and before the step of accessing the optical disc by the PUH at the target data transfer rate with the appropriate laser power, the method further comprises:
   adjusting a current laser power with which the PUH currently accesses the optical disc according to the first laser power, the appropriate laser power, or both; and moving the PUH to the target location.

7. The method of claim 6, wherein the first laser power is fixed.

8. The method of claim 6, wherein the first data transfer rate is the maximum data transfer rate at which the PUH can correctly access the optical disc with the first laser power.

9. The method of claim 6, wherein the PUH accesses the optical disc under a preset motor control mode, and the step of identifying the target data transfer rate utilized by the PUH for accessing the optical disc comprises determining the target data transfer rate according to the target location and the preset motor control mode.

10. An optical disc information reproduction device, which comprises a pickup head (PUH) for accessing an optical disc, comprising:
- a decision unit, electrically coupled to the PUH, for identifying a target data transfer rate utilized by the PUH for accessing the optical disc;
- a calculation unit, electrically coupled to the decision unit, for calculating an appropriate laser power according to the target data transfer rate; and
- a control unit, electrically coupled to the PUH, the decision unit, and the calculation unit, for controlling the PUH to access the optical disc at the target data transfer rate with the appropriate laser power;
- wherein the calculation unit sets the appropriate laser power as a first laser power directly if the target data transfer rate is not greater than a first data transfer rate, and the calculation unit determines the appropriate laser power between the first laser power and a second laser power if the target data transfer rate is between the first data transfer rate and a second data transfer rate, where the first laser power corresponds to the first data transfer rate, and the second laser power corresponds to the second data transfer rate.

11. The device of claim 10, wherein the calculation unit performs a linear interpolation to determine the appropriate laser power between the first laser power and the second laser power if the target data transfer rate is between the first data transfer rate and the second data transfer rate.

12. The device of claim 10, wherein the first laser power corresponding to any identified target data transfer rate not greater than the first data transfer rate is fixed.

13. The device of claim 10, wherein the first data transfer rate is the maximum data transfer rate at which the PUH can correctly access the optical disc with the first laser power, and the second laser power is the maximum laser power with which the PUH can correctly access the optical disc at the second data transfer rate.

14. The device of claim 10, wherein the PUH accesses the optical disc under a preset motor control mode, and the decision unit detects a current location on the optical disc currently accessed by the PUH and then determines the target data transfer rate according to the current location and the preset motor control mode.

15. An optical disc information reproduction device, which comprises a pickup head (PUH) for accessing an optical disc, comprising:
- a decision unit, electrically counted to the PUH, for identifying a target data transfer rate utilized by the PUH for accessing the optical disc;
- a calculation unit, electrically coupled to the decision unit, for calculating an appropriate laser power according to the target data transfer rate;
- a control unit, electrically coupled to the PUH, the decision unit, and the calculation unit, for controlling the PUH to access the optical disc at the target data transfer rate with the appropriate laser power; and
- a moving mechanism, connected to the PUH and the control unit,
- wherein the calculation unit sets the appropriate laser power as a first laser power directly if the target data transfer rate is not greater than a first data transfer rate, and the control unit receives a seek command indicating the PUH is requested to be moved to a target location, adjusts a current laser power with which the PUH currently accesses the optical disc according to the first laser power, the appropriate laser power, or both, and then controls the moving mechanism to move the PUH to the target location.

16. The device of claim 15, wherein the first laser power is fixed.

17. The device of claim 15, wherein the first data transfer rate is the maximum data transfer rate at which the PUH can correctly access the optical disc with the first laser power.

18. The device of claim 15, wherein the PUH accesses the optical disc under a preset motor control mode, and the decision unit determines the target data transfer rate according to the target location and the preset motor control mode.

* * * * *